(12) United States Patent
Maeda (10) Patent No.: US 7,738,351 B2
(45) Date of Patent: Jun. 15, 2010

(54) SIGNAL PROCESSING CIRCUIT AND REPRODUCING APPARATUS

(75) Inventor: Takanori Maeda, Saitama (JP)

(73) Assignee: Pioneer Corporation, Tokyo (JP)

( * ) Notice: Subject to any disclaimer, the term of this patent is extended or adjusted under 35 U.S.C. 154(b) by 413 days.

(21) Appl. No.: 11/887,375

(22) PCT Filed: Mar. 31, 2006

(86) PCT No.: PCT/JP2006/306843

§ 371 (c)(1),
(2), (4) Date: Nov. 21, 2007

(87) PCT Pub. No.: WO2006/106924

PCT Pub. Date: Oct. 12, 2006

(65) Prior Publication Data

US 2009/0252024 A1    Oct. 8, 2009

(30) Foreign Application Priority Data

Mar. 31, 2005    (JP) ............................. 2005-102560

(51) Int. Cl.
*G11B 9/00*    (2006.01)
*G01R 31/02*    (2006.01)

(52) U.S. Cl. .................. 369/126; 324/754; 324/762

(58) Field of Classification Search .............. 369/126; 324/754, 762

See application file for complete search history.

(56) References Cited

U.S. PATENT DOCUMENTS

| 7,184,388 | B2* | 2/2007 | Champion et al. | 369/126 |
| 7,283,453 | B2* | 10/2007 | Onoe et al. | 369/126 |
| 7,471,614 | B2* | 12/2008 | Frommer et al. | 369/126 |
| 2003/0142620 | A1* | 7/2003 | Onoe et al. | 369/272 |
| 2003/0169672 | A1* | 9/2003 | Onoe et al. | 369/126 |
| 2004/0235147 | A1* | 11/2004 | Chappell | 435/287.2 |
| 2005/0231225 | A1* | 10/2005 | Park et al. | 324/762 |

FOREIGN PATENT DOCUMENTS

| JP | 2003-228895 | 8/2003 |
| JP | 2003-263804 | 9/2003 |

OTHER PUBLICATIONS

PCT International Search Report mailed Jul. 18, 2006.

* cited by examiner

*Primary Examiner*—Joseph H Feild
*Assistant Examiner*—Nicholas Lee
(74) *Attorney, Agent, or Firm*—Nixon & Vanderhye P.C.

(57) ABSTRACT

A signal processing circuit is provided with a signal input layer having a plurality of signal input sections which receive signal input; a plurality of signal processing layers whereupon a plurality of signal processing sections, which are arranged corresponding to each of the signal input sections and processes in parallel signals from the signal input sections, are dispersed; and connecting lines for associating and connecting the signal input sections with the signal processing sections, respectively. The size of a region occupied by each of the signal processing sections on the signal processing layers is larger than the arrangement intervals between the signal input sections on the signal input layers.

24 Claims, 6 Drawing Sheets

SIGNAL PROCESSING CIRCUIT AND REPRODUCING APPARATUS

This application is the U.S. national phase of International Application No.
PCT/JP2006/306843 filed 31 Mar. 2006 which designated the U.S. and claims priority to JP 2005-102560 filed 31 Mar. 2005, the entire contents of each of which are hereby incorporated by reference.

TECHNICAL FIELD

The present invention relates to a signal processing circuit for performing signal processing in reproducing polarization information recorded in a dielectric substance such as a ferroelectric recording medium, and a reproducing apparatus which uses the signal processing circuit.

BACKGROUND ART

The inventor of the present invention and others have proposed a technology of a recording/reproducing apparatus using SNDM (Scanning Nonlinear Dielectric Microscopy) for nanoscale analysis of a dielectric recording medium. In the SNDM, by using a plurality of conductive probes having a small projective portion on the tip, which are used for atomic force microscopy (AFM) or the like, the resolution of measurement can be increased to sub-nanometer. Recently, by applying the technology of SNDM, a super high-density recording/reproducing apparatus has been developed, wherein the recording/reproducing apparatus records data into a recording medium having a recording layer made of a ferroelectric material (refer to a patent document 1).

On the recording/reproducing apparatus using such SNDM, the information is reproduced by detecting the positive/negative direction of polarization of the recording medium. This is performed by using the fact that the oscillation frequency of a LC oscillator, which includes a high-frequency feedback amplifier including a L component, the electrically conductive probe mounted on the amplifier, and the capacitance Cs of a ferroelectric material under the probe, is changed by a change ΔC in small capacitance, which is caused by the extent of a non-linear dielectric constant due to the distribution of the positive/negative polarization. That is, this is performed by detecting a change in the distribution of the positive/negative polarization, as a change in oscillation frequency Δf.

Moreover, in order to detect the difference in the positive/negative polarization, an alternating electric field is applied at sufficiently lower frequency than the oscillation frequency, by which the oscillation frequency changes with the alternating electric field. At the same time, a ratio of the change in the oscillation frequency, including a code or sign, is determined from the non-linear dielectric constant of the ferroelectric material under the probe. Moreover, by FM (Frequency Modulation)-demodulating and extracting a component caused by the alternating electric field, from a high-frequency signal of the LC oscillator, which is FM-modulated in accordance with the change ΔC in the small capacitance associated with the application of the alternating electric field, the record information recorded in the ferroelectric recording medium is reproduced.

The plurality of probes used here are arranged in a one-dimensional or two-dimensional matrix on a circuit substrate. Moreover, if signals detected on the respective plurality of probes are processed, independently and simultaneously, a plurality of signal processing devices, which correspond to the respective plurality of probes, are formed on the same circuit substrate. At this time, in order to form the signal processing devices (more specifically, the aforementioned LC oscillators or the like) correspondingly to the probes, the size of each of the signal processing devices needs to be determined depending on an interval in the arrangement of the probes Patent document 1: Japanese Patent Application Laying Open NO. 2003-085969

DISCLOSURE OF INVENTION

Subject to be Solved by the Invention

Thus, this causes such a technical problem that the signal processing devices, which are relatively large, cannot be formed correspondingly to the probes. Therefore, the signal processing devices, which are relatively large, need to be formed on a circuit substrate which is separated from the circuit substrate for the probes. That is, the signals detected on the respective plurality of probes need to be extracted to the exterior of the circuit substrate constructed for the probes, and then the signals are processed on the signal processing circuits which are separately formed on the exterior. However, on the probes which treat e.g. high-frequency signals (e.g. the probes used for the recording/reproducing apparatus using the aforementioned SNDM, or the like), when the signals detected on the respective plurality of probes are extracted to the exterior of the circuit substrate constructed for the probes, floating capacitance is possibly changed, or noise is possibly superimposed on the signals. As a result, there is such a technical problem that the stability of the operation related to the signal processing is reduced.

In order to solve the aforementioned problems, it is therefore an object of the present invention to provide a signal processing circuit which can ensure the stability of the operation related to the signal processing, and a reproducing apparatus which is provided with such a signal processing circuit.

Means for Solving the Object (Signal Processing Circuit)

The above object of the present invention can be achieved by a first signal processing circuit provided with: a signal input layer provided with a plurality of signal inputting devices which are arranged with a predetermined arrangement interval and each of which receives a signal input; a plurality of signal processing layers in which a plurality of signal processing devices are distributedly arranged, the signal processing devices being provided correspondingly to the respective plurality of signal inputting devices, the signal processing devices performing a parallel operation on signals from the plurality of signal inputting devices; and connection lines for connecting the plurality of signal inputting devices and the respective plurality of signal processing devices in association with each other, a size of an area occupied by each of the plurality of signal processing devices on the plurality of signal processing layers being larger than the arrangement interval of the plurality of signal inputting devices on the signal input layer.

According to the first signal processing circuit of the present invention, the signal input layer provided with the plurality of signal inputting devices and the plurality of signal processing layers provided with the plurality of signal processing devices are arranged so as to have a multilayer structure. Each of the plurality of signal inputting devices is disposed on the signal input layer such that adjacent two signal inputting devices have the predetermined arrangement interval. The signal inputted to each of the plurality of signal inputting devices is outputted to the corresponding signal processing device through the connection line.

The plurality of signal processing devices are arranged so as to correspond to the respective plurality of signal inputting devices. More specifically, the signal processing devices are arranged such that a signal inputted to one signal inputting device is processed on one signal processing device and a signal inputted to another signal inputting device is processed on another signal processing device. Therefore, the signal inputted on each of the plurality of signal inputting devices is processed on the corresponding signal processing device, by which the parallel operation is performed on the signal inputted on each of the plurality of signal inputting devices. The plurality of signal processing devices are arranged to be distributed in the plurality of signal processing layers. That is, each of the plurality of signal processing devices is not disposed on the single signal processing layer, each of the plurality of signal processing devices is disposed to be distributed uniformly or not-uniformly on the plurality of signal processing layers. More specifically, the signal processing device which belongs to one group out of the plurality of signal processing devices is disposed on one signal processing layer. On the other hand, the signal processing device which belongs to another group out of the plurality of signal processing devices is disposed on another signal processing layer which is different from the one signal processing layer.

On the first signal processing circuit, in particular, the size of an area occupied by each of the plurality of signal processing devices is larger than the arrangement interval of the plurality of signal inputting devices. In other words, the size of the area occupied by each of the plurality of signal processing devices on the respective plurality of signal processing layers is larger than the size of an area which can be occupied by each of the plurality of signal inputting devices on the signal processing layer. This can be realized because the plurality of signal processing devices are arranged to be distributed in the plurality of signal processing layers, as described above.

By this, it is possible to increase the size of each of the signal processing devices, compared with the case that each of the plurality of signal processing devices is disposed on the single signal processing layer. Thus, the signal processing device, which needs a relatively large space, can be disposed with it accompanying the signal inputting device. That is, it is possible to construct the signal processing circuit in which the signal inputting device and the signal processing device are unified. Therefore, it is not necessary to perform the signal processing on the external signal processing circuit after the signals inputted to the exterior, separated from and independent of the signal inputting devices, are extracted. In particular, if the signal inputted to the signal inputting device is a high-frequency signal, it is possible to inhibit a change in floating capacitance, the generation of noise, and the like, which are caused by the extraction of the signals to the exterior. By this, it is possible to reduce a SN ratio in the process of the signal processing, to thereby preferably ensure the stability of the operation related to the signal processing. Moreover, even if the signals are outputted to another signal processing devices which are provided on the exterior of the first signal processing circuit, because the signal processing is already performed on the signal processing devices which are arranged with them accompanying the signal inputting devices, it is possible to output more stable signals.

Incidentally, the signal input layer may be formed on the same layer as any one of the plurality of signal processing layers. The point is that the layer with the signal inputting device disposed is the signal input layer, and that the layer with the signal processing device disposed is the signal processing layer. The layer with both the signal inputting device and the signal processing device disposed can be the signal input layer and the signal processing layer.

The above object of the present invention can be also achieved by a second signal processing circuit provided with: a signal input layer provided with a plurality of signal inputting devices which are arranged in a matrix with a predetermined arrangement interval and each of which receives a signal input; a plurality of signal processing layers in which a plurality of signal processing devices are distributedly arranged, the signal processing devices being provided correspondingly to the respective plurality of signal inputting devices, the signal processing devices performing a parallel operation on the signals from the plurality of signal inputting devices; and connection lines for connecting the plurality of signal inputting devices and the respective plurality of signal processing devices in association with each other, the number of the plurality of signal processing devices on each of the plurality of signal processing layers being smaller than the number of the plurality of signal inputting devices on the signal input layer.

According to the second signal processing circuit of the present invention, as in the first signal processing circuit, the signal input layer provided with the plurality of signal inputting devices and the plurality of signal processing layers provided with the plurality of signal processing devices are arranged so as to have a multilayer structure.

On the second signal processing circuit, particularly, the number of the signal processing devices on each of the plurality of signal processing layers is smaller than the number of the signal inputting devices on the signal input layer. In other words, the plurality of signal processing devices are distributedly arranged in the plurality of signal processing layers such that the number of the signal processing devices on one signal processing layer is smaller than the number of the signal inputting devices on the signal input layer.

By this, as in the first signal processing circuit, it is possible to increase the size of each of the signal processing devices, compared with the case that each of the plurality of signal processing devices is disposed on the single signal processing layer. Therefore, it is possible to receive the same benefits as those of the first signal processing circuit.

In one aspect of the first or second signal processing circuit of the present invention, the plurality of signal inputting devices are arranged in a two-dimensional matrix According to this aspect, even if the signal inputting devices, which are arranged in the two-dimensional matrix, are provided, the aforementioned various benefits can be preferably received. Moreover, since the signal inputting devices are arranged in the two-dimensional matrix, it is possible to receive more signal inputs, and it is also perform the parallel operation on the signals. By this, it is possible to perform the signal processing more quickly or efficiently.

In another aspect of the first or second signal processing circuit of the present invention, at least one of the plurality of signal inputting devices includes an electrically conductive probe which is close to or contacts a micro domain on a medium, which is a target to receive the signal input.

According to this aspect, the signal inputting device can detect a physical, chemical or electromagnetic change in the micro domain on the medium. Therefore, it is possible to preferably ensure the stability of the observation operation of the medium, which uses the aforementioned change, or various operations, such as data recording/reproduction operations with respect to the medium.

In another aspect of the first or second signal processing circuit of the present invention, at least one of the plurality of signal processing devices converts a capacitance change in a micro domain on a medium, which is a target to receive the signal input, to a voltage change.

According to this aspect, it is possible to stably perform the data reproduction operation using e.g. SNDM. In particular, a high-frequency signal is used in the reproduction operation using the SNDM, so that the prevention of the change in floating capacitance, the generation of noise, and the like is extremely effective for the stable reproduction operation.

In another aspect of the first or second signal processing circuit of the present invention, at least one of the plurality of signal processing devices includes an oscillation circuit whose oscillation frequency changes depending on a capacitance change in a micro domain on a medium, which is a target to receive the signal input.

According to this aspect, since the oscillation circuit can be disposed correspondingly to each of the signal inputting devices, it is possible stably detect a change in the oscillation frequency corresponding to each of the signal inputting devices, while preventing a bad influence by the change in floating capacitance and the generation of noise, in the data reproduction operation using the SNDM. Thus, the reproduction operation using the SNDM can be performed stably. In addition, it is possible to detect the change in the oscillation frequency, in parallel (i.e. simultaneously on each of the signal inputting devices).

In another aspect of the first or second signal processing circuit of the present invention, at least one of the plurality of signal processing devices further includes an intermediate frequency conversion circuit for converting the oscillation frequency to an intermediate frequency.

According to this aspect, since the intermediate frequency conversion circuit can be disposed correspondingly to each of the signal inputting devices, it is possible stably convert the oscillation frequency corresponding to each of the signal inputting devices to the intermediate frequency, while preventing the bad influence by the change in floating capacitance and the generation of noise, in the data reproduction operation using the SNDM. Moreover, if the signal inputted as the high-frequency signal is converted to the intermediate frequency and then outputted to a signal processing circuit which is provided on the exterior of the signal processing circuit, it is possible to output the signal while preferably inhibiting the generation of floating capacitance and the like. Thus, it is possible to stably perform the reproduction operation using the SNDM.

In another aspect of the first or second signal processing circuit of the present invention, it is further provided with a sealed layer, which defines a ground potential, between each two of the plurality of signal processing layers.

According to this aspect, it is possible to preferably eliminate an increase in noise by the crosstalk or the like of the high-frequency, which can be caused by disposing the plurality of signal processing devices on the same circuit substrate. By this, even the signal processing circuit which employs the aforementioned construction can realize the stable signal processing with a less bad influence by high-frequency crosstalk.

In another aspect of the first or second signal processing circuit of the present invention, it is further provided with a first-stage processing layer which is provided with a plurality of first-stage processing devices which are disposed correspondingly to the respective plurality of signal inputting devices and which perform a first-stage process on the signals from the plurality of signal inputting devices, the connection lines connecting the plurality of signal inputting devices and the respective plurality of first-stage processing devices in association with each other, the connection lines connecting the plurality of first-stage processing devices and the respective plurality of signal processing devices in association with each other.

According to this aspect, before the parallel operation is performed on the signal on the signal processing circuit, the first-stage process is performed on the signal on the first-stage processing device. After the first-stage processing performed on the signal (more specifically, an amplification process performed on the signal, or the like) by the first-stage processing device is ended, the first-stage-processed signal is outputted to the signal processing device through the connection line. Here, the plurality of first-stage processing devices are arranged on the single first-stage processing layer. Therefore, it is possible to form the signal processing circuit, which only needs a relatively small space, as the first-stage processing device, and to form the signal processing circuit, which needs a relatively large space, as the signal processing device.

In an aspect of the signal processing circuit provided with the first-stage processing circuit as described above, at least one of the plurality of first-stage processing devices includes an oscillation circuit whose oscillation frequency changes depending on a capacitance change in a micro domain on a medium, which is a target to receive the signal input.

According to this aspect, it is possible to dispose the oscillation circuit correspondingly to each of the signal inputting devices. In addition, it is possible to detect the change in the oscillation frequency in parallel.

In an aspect of the signal processing circuit provided with the first-stage processing circuit as described above, at least one of the plurality of first-stage processing devices further includes an intermediate frequency conversion circuit for converting the oscillation frequency to an intermediate frequency.

According to this aspect, it is possible to dispose the intermediate frequency conversion circuit correspondingly to each of the signal inputting devices.

(Reproducing Apparatus)

The above object of the present invention can be also achieved by a reproducing apparatus for reproducing data recorded in a recording medium, the reproducing apparatus provided with: the aforementioned first or second signal processing circuit of the present invention (including its various aspects); and a reproducing device for reproducing the data on the basis of processing results by the plurality of signal processing devices.

According to the reproducing apparatus of the present invention, the signal corresponding to the data recorded in the recording medium is inputted to the signal inputting device as a reproduction signal. This reproduction signal is processed while the bad influence, caused by the change in floating capacitance, the generation of noise, and the like, is inhibited on the plurality of signal processing devices. After that, by virtue of the operation of the reproducing device, the data is reproduced which is obtained in accordance with the results of the signal processing performed on the reproduction signal on the signal processing devices. Therefore, according to the reproducing apparatus of the present invention, it is possible to stably reproduce the data.

In one aspect of the reproducing apparatus of the present invention, the reproducing apparatus reproduces the data recorded in the recording medium in a flat plane shape, and the reproducing apparatus detects information recorded in the medium by relatively moving a probe, which is one specific example of the signal inputting device, and scanning in the flat plane of the recording medium.

Incidentally, in response to the various aspects of the aforementioned first or second signal processing circuit of the present invention, the reproducing apparatus of the present invention can also employ various aspects.

These effects and other advantages of the present invention will become more apparent from the following embodiment.

As explained above, on the first signal processing circuit of the present invention, the size of the area occupied by each of the plurality of signal processing devices is larger than the arrangement interval of the signal inputting devices. Moreover, on the second signal processing circuit of the present invention, the number of the signal processing devices on each of the plurality of signal processing layers is smaller than the number of the signal inputting devices on the signal processing layer. Therefore, it is possible to ensure the stability of the operation related to the signal processing.

DESCRIPTION OF REFERENCE CODES 1 dielectric recording/reproducing apparatus
11 probe
13 oscillator
29 intermediate frequency convertor
30 demodulator
34 signal detector
100, 101, 102 signal processing circuit
111 to 119 probe
131 signal processing device
141 to 149 connection Line
171, 172 shield layer
181 first-stage processing device
200 first-stage circuit
201 first circuit
202 second circuit
203 third circuit

BEST MODE FOR CARRYING OUT THE INVENTION

Hereinafter, the best mode for carrying out the present invention will be explained for each embodiment in order with reference to the drawings. Incidentally, in the embodiment below, an explanation will be given on the case that the signal processing circuit and the reproducing apparatus of the present invention are applied to a dielectric recording/reproducing apparatus which uses SNDM.

Firstly, with reference to FIG. 1 to FIG. 4, the dielectric recording/reproducing apparatus in the embodiment of the present invention will be explained.

(i) Basic Structure

Figure 1:
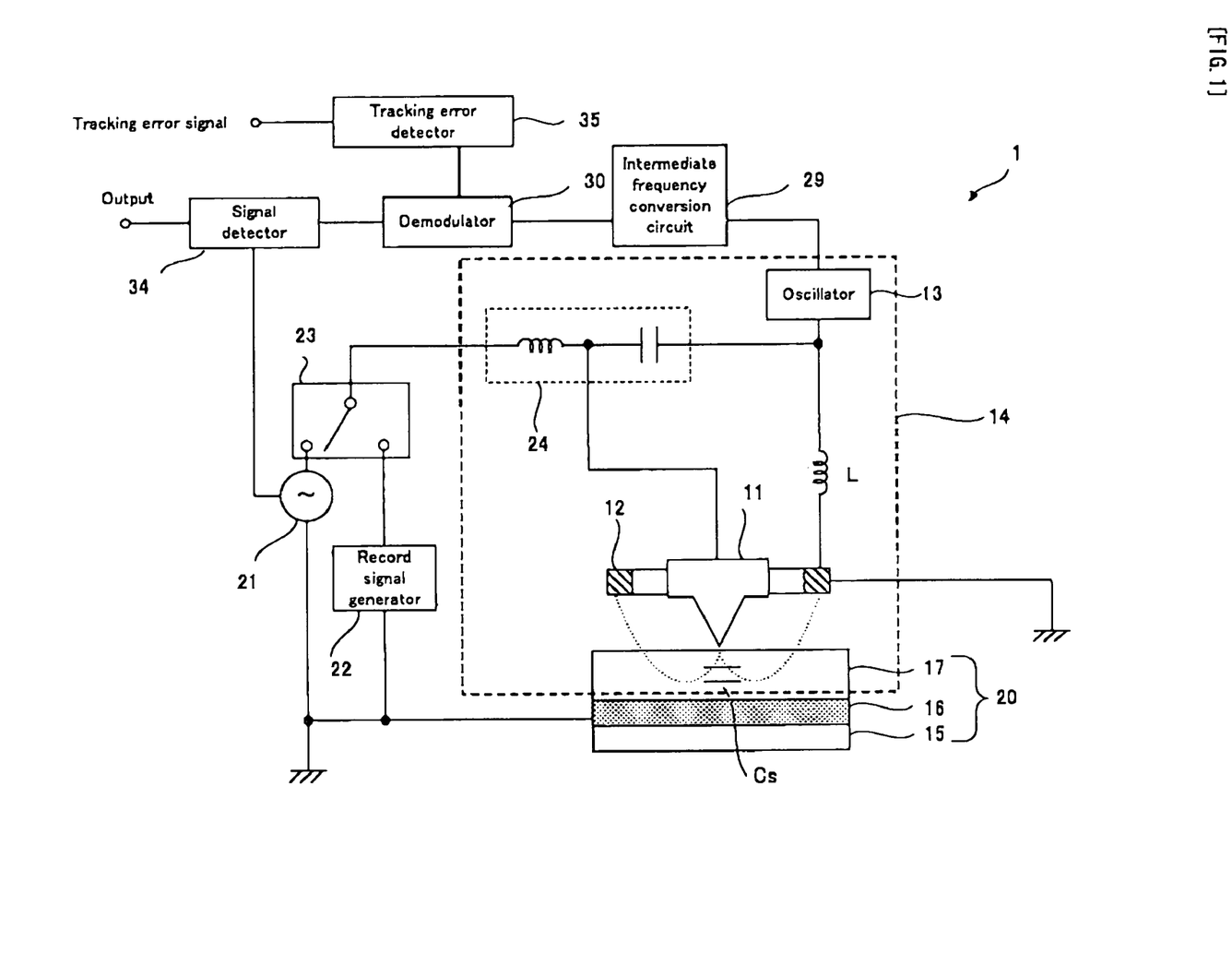
FIG. 1 is a block diagram conceptually showing the basic structure of a dielectric recording/reproducing apparatus in an embodiment.

Firstly, the basic structure of the dielectric recording/reproducing apparatus in the embodiment will be explained with reference to FIG. 1. FIG. 1 is a block diagram conceptually showing the basic structure of the dielectric recording/reproducing apparatus in the embodiment.

A dielectric reproducing/reproducing apparatus 1 is provided with: a probe 11 which is close to or contacts a medium; a return electrode 12 for returning thereto a high-frequency signal for signal reproduction, which is applied from the probe 11; an inductor L disposed between the probe 11 and the return electrode 12; an oscillator 13 which oscillates at a resonance frequency determined from the inductor L and a capacitance Cs of a portion which is polarized in accordance with record information and which is formed in a surface layer or inside of a dielectric material 17 under the probe 11; an alternating current (AC) signal generator 21 for applying an alternating electric field to detect the state of the polarization recorded in the dielectric material 17; a record signal generator 22 for recording the polarization state into the dielectric material; a switch 23 for changing the outputs of the AC signal generator 21 and the record signal generator 22; a HPF (High Pass Filter) 24; a demodulator 30 for demodulating a FM signal modulated by the capacitance corresponding to the polarization state owned by the dielectric material 17 under the probe 11; a signal detector 34 for detecting data from the demodulated signal; a tracking error detector 35 for detecting a tracking error signal from the demodulated signal; and the like.

The probe 11 is connected to the oscillator 13 through the HPF 24, and is connected to the AC signal generator 21 and the record signal generator 22 through the HPF 24 and the switch 23. Then, it functions as an electrode for applying an electrical field to the dielectric material 17.

The return electrode 12 is an electrode for returning thereto a high-frequency electric field applied to the dielectric material 17 from the probe 11 (i.e. a resonance electric field from the oscillator 13), and is disposed to surround the probe 11. Incidentally, if the high-frequency electric field returns to the return electrode 12 without resistance, the shape and the arrangement of the return electrode 12 can be arbitrarily set.

Incidentally, in the embodiment, for simplification of explanation, only one probe 11 is shown in FIG. 1; however, actually, a plurality of probes 11 are provided. In this case, a plurality of AC signal generators 21 are provided correspondingly to the respective probes 11. Moreover, in order to discriminate reproduction signals corresponding to the respective AC signal generators 21 on the signal detector 34, a plurality of signal detectors 34 are provided, and the signal detectors 34 obtain reference signals from the respective AC signal generators 21, to thereby output the corresponding reproduction signals.

The inductor L is disposed between the probe 11 and the return electrode 12, and may be formed from a microstripline, for example. A resonance circuit 14 is constructed including the inductor L and the capacitance Cs. The inductance of the inductor L is determined such that this resonance frequency is approximately 1 GHz, for example.

The AC signal generator 21 applies an alternating electric field between the return electrode 11 and an electrode 16. Moreover, in the dielectric recording/reproducing apparatus which uses a plurality of probes 11, the frequencies of the alternating electric fields are used as reference signals, to thereby discriminate signals detected on the probes 11. The frequencies are centered on about 10 kHz. In that condition, the alternating electric fields are applied to the small domains of the dielectric material 17.

The oscillator 13 is an oscillator which oscillates at the resonance frequency determined from the inductor L and the capacitance Cs. The oscillation frequency varies, depending on the change of the capacitance Cs. Therefore, FM modulation is performed correspondingly to the change of the capacitance Cs determined by a polarization domain corresponding to the recorded data. By demodulating this FM modulation, it is possible to read the data recorded in a dielectric recording medium 20.

Incidentally, as described in detail later, the probe 11, the return electrode 12, the oscillator 13, the inductor L, the HPF 24, and the capacitance Cs in the dielectric material 17 constitute the resonance circuit 14, and the FM signal amplified in the oscillator 13 is outputted to the demodulator 30.

The record signal generator 22 generates a signal for recording and supplies it to the probe 11 at the time of recording. This signal is not limited to a digital signal and it may be an analog signal. The signal includes various signals, such as audio information, video information, and digital data for a computer. Moreover, the AC signal superimposed on the record signal is to discriminate and reproduce the information on each probe, as the reference signal at the time of signal reproduction.

The switch 23 selects the output so as to supply, to the probe 11, the signal from the AC signal generator 21 at the time of reproduction and the signal from the record signal generator 23 at the time of recording. For this apparatus, a mechanical relay and a semiconductor circuit are used. The switch 23 is preferably constructed from the relay in the case of the analog signal, and the semiconductor circuit in the case of the digital signal.

The HPF 24 includes an inductor and a condenser, and is used to form a high pass filter for cutting off a signal system so that the signals from the AC signal generator 21 and the record signal generator 23 do not interfere with the oscillation of the oscillator 13. The cutoff frequency is $f=\frac{1}{2\pi}\sqrt{\{LC\}}$. Here, L is the inductance of the inductor included in the HPF 24, and C is the capacitance of the condenser included in the HPF 24. The frequency of the AC signal is about 100 KHz, and the oscillation frequency of the oscillator 13 is about 1 GHz, Thus, the separation is sufficiently performed on a first order LC filter. A higher-order filter may be used, but that increases the number of elements and possibly increases the apparatus size.

An intermediate frequency convertor 29 converts a FM signal with an oscillation frequency of about 1 GHz on the oscillator 13, to a signal with an intermediate frequency which is about several tens MHz.

The demodulator 30 demodulates the FM signal, which is converted to the intermediate frequency, and reconstructs a waveform corresponding to the polarized state of a portion which is traced by the probe 11. If the recorded data are digital data of "0" and "1", there are two types of frequencies to be demodulated. By judging the frequency, the data reproduction is easily performed.

The signal detector 34 reproduces the recorded data from the signal demodulated on the demodulator 30. A lock-in amplifier is used as the signal detector 34, for example, and coherent detection or synchronized detection is performed on the basis of the frequency of the alternating electric field of the AC signal generator 21, to thereby reproduce the data. Incidentally, it will be obvious that another phase detection device may be used.

The tracking error detector 35 detects a tracking error signal for controlling the apparatus, from the signal demodulated on the demodulator 30. The detected tracking error signal is inputted into a tracking mechanism for the control.

Figure 2:
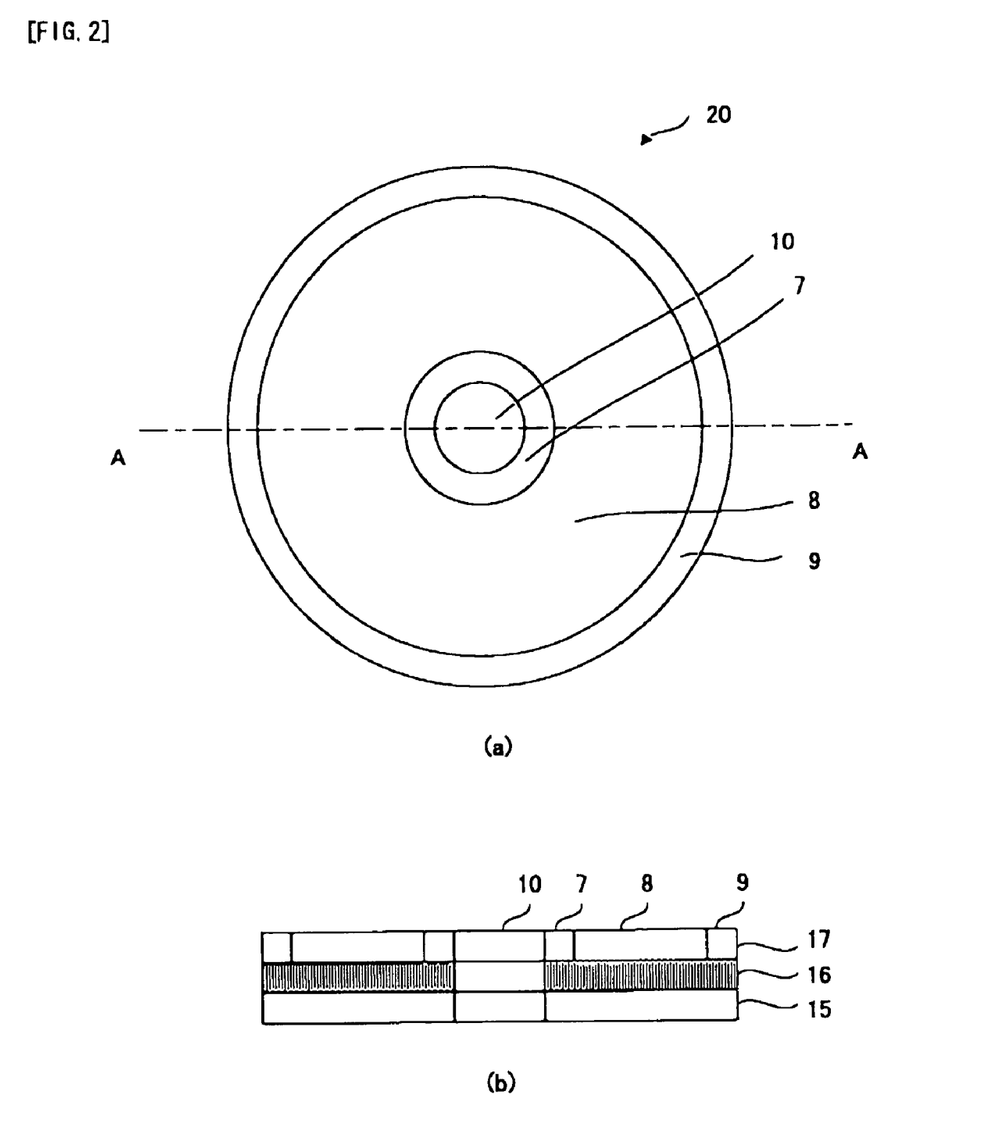
FIG. 2 are a plan view and a cross sectional view conceptually showing a dielectric recording medium, which is used for the reproduction of the dielectric recording/reproducing apparatus in the embodiment.

Next, one example of the dielectric recording medium 20 shown in FIG. 1 will be explained with reference to FIG. 2. FIG. 2 are a plan view and a cross sectional view conceptually showing one example of the dielectric recording medium 20 used in the embodiment.

As shown in FIG. 2(*a*), the dielectric recording medium 20 is a disc-shaped dielectric recording medium, and is provided with: for example, a center hole 10; and an inner area 7, a recording area 8, and an outer area 9, which are located from the inside in this order, concentrically with respect to the center hole 10. The center hole 10 is used for mounting the dielectric recording medium 20 on a spindle motor or in a similar case.

The recording area 8 is an area to record the data therein and has tracks and spaces between the tracks. Moreover, for the tracks and the spaces, there is provided an area to record therein control information associated with the record and reproduction. Furthermore, the inner area 7 and the outer area 8 are used to recognize the inner position and the outer position of the dielectric recording medium 20, respectively, and can be used as areas to record therein information about the data to be recorded, such as a title, its address, a recording time length, and a recording capacity. Incidentally, the above-described structure is one example of the dielectric recording medium 20, and another structure, such as a card-shape, can be also employed.

Moreover, as shown in FIG. 2(*b*), the dielectric recording medium 20 is formed such that the electrode 16 is laminated on a substrate 15 and that the dielectric material 17 is laminated on the electrode 16.

The substrate 15 is Si (silicon), for example, which is a preferable material in its strength, chemical stability, workability, or the like. The electrode 16 is intended to generate an electric field between the electrode 16 and the probe 11 (or the return electrode 12). By applying such an electric field to the dielectric material 17 that is equal to or stronger than the coercive electric field of the dielectric material 17, the polarization direction is determined. By determining the polarization direction in accordance with the data, the recording is performed.

The dielectric material 17 is formed by a known technology, such as spattering $LiTaO_3$ or the like, which is a ferroelectric substance, onto the electrode 16. Then, the recording is performed with respect to the Z surface of $LiTaO_3$ in which the plus and minus surfaces of the polarization have a 180-degree domain relationship. It will be obvious that another dielectric material may be used. In the dielectric material 17, the small polarization is formed at high speed, by a voltage for data, which is applied simultaneously with a direct current bias voltage.

Moreover, as the shape of the dielectric recoding medium 20, for example, there are a disc shape and a card shape and the like. The displacement of the relative position with respect to the probe 11 is performed by the rotation of the medium, or by displacing either the probe 11 or the medium linearly (e.g. on two axes of an X axis a Y axis).

(ii) Operation Principle

Next, with reference to FIG. 3 and FIG. 4, the operation principle of the dielectric recording/reproducing apparatus 1 in the embodiment will be explained. Incidentally, in the explanation below, one portion of the constituent elements of the dielectric recording/reproducing apparatus 1 shown in FIG. 1 is extracted and explained.

(Recording Operation)

Firstly, with reference to FIG. 3, the recording operation of the dielectric recording/reproducing apparatus in the embodiment will be explained. FIG. 3 is a cross sectional view conceptually showing the information recording operation.

Figure 3:
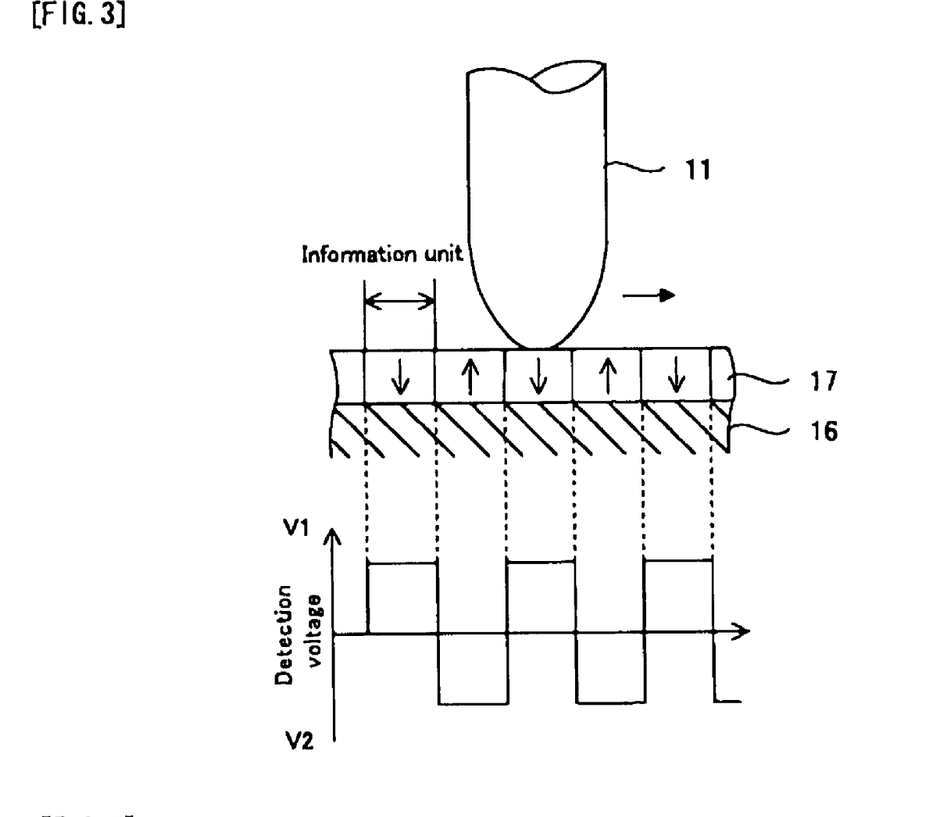
FIG. 3 is a cross sectional view conceptually showing a recording operation of the dielectric recording/reproducing apparatus in the embodiment.

As shown in FIG. 3, by applying an electric field which exceeds the coercive electric field of the dielectric material 17 between the probe 11 and the electrode 16, the dielectric material 17 is polarized having a direction corresponding to the direction of the applied electric field. Then, by controlling an applying voltage to thereby change the polarization direction, it is possible to record the predetermined information. This uses such a characteristic that if an electric field which exceeds the coercive electric field of a dielectric substance is applied to the dielectric substance (particularly, a ferroelectric substance), the polarization direction is reversed, and that the polarization direction is maintained.

For example, it is assumed that the micro domain has downward polarization P by applying an electric field which directs from the probe 11 to the electrode 16, and that the micro domain has upward polarization P by applying an electric field which directs from the probe 11 to the electrode 16. This corresponds to the state that the data information is recorded. If the probe 11 is operated in an arrow-pointing direction, a detection voltage corresponds to the polarization P and is outputted as a square wave which swings up and down.

(Reproduction Operation)

Next, with reference to FIG. 4, the reproduction operation of the dielectric recording/reproducing apparatus 1 in the embodiment will be explained. FIG. 4 is a cross sectional view conceptually showing the information reproduction operation.

The nonlinear dielectric constant of a dielectric substance changes in accordance with the polarization direction of the dielectric substance. The nonlinear dielectric constant of the dielectric substance can be detected as a difference in the capacitance of the dielectric substance or a difference in the capacitance change, when an electric field is applied to the dielectric substance. Therefore, by applying an electric field to the dielectric material and by detecting a difference in the capacitance Cs or a difference in the change of the capacitance Cs in a certain domain of the dielectric material at that time, it is possible to read and reproduce the data recorded as the polarization direction of the dielectric material.

Figure 4:
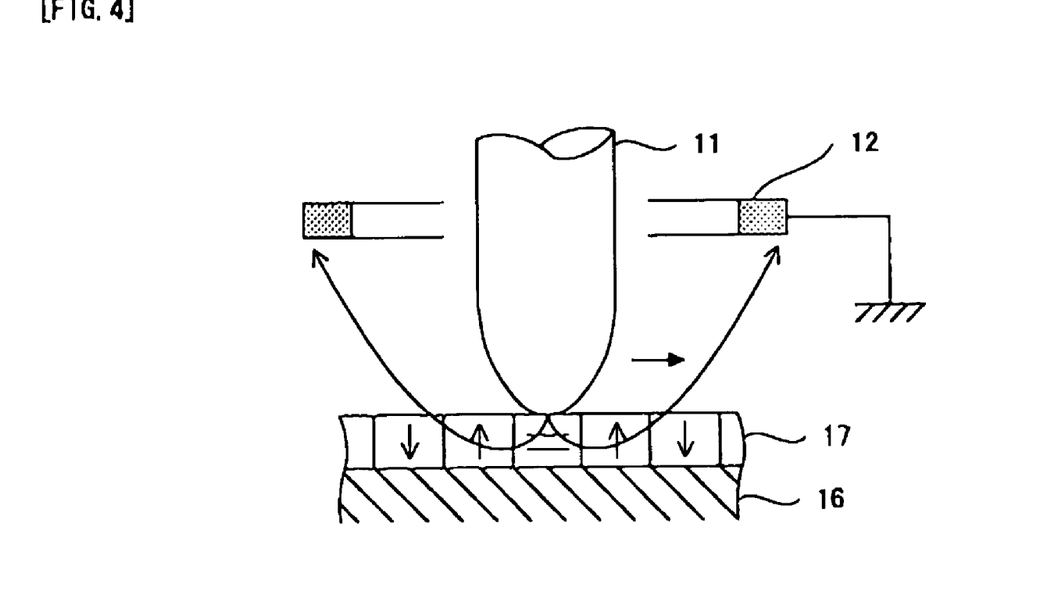
FIG. 4 is a cross sectional view conceptually showing a reproduction operation of the dielectric recording/reproducing apparatus in the embodiment.

Specifically, firstly, as shown in FIG. 4, an alternating electric field from the not-illustrated AC signal generator 21 is applied between the electrode 16 and the probe 11. The alternating electric field has an electric field strength which does not exceed the coercive electric field of the dielectric material 17, and has a frequency of approximately 100 kHz, for example. The alternating electric field is generated mainly to discriminate the difference in the capacitance change corresponding to the polarization direction of the dielectric material 17. Incidentally, instead of the alternating electric field, a direct current bias voltage may be applied to form an electric field in the dielectric material 17. The application of the alternating electric field causes the generation of an electric field in the dielectric material 17 of the dielectric recording medium 20.

Then, the probe 11 is put closer to a recording surface until the distance between the tip of the probe 11 and the recording surface becomes extremely small on the order of nanometers. Under this condition, the oscillator 13 is driven. Incidentally, in order to detect the capacitance Cs of the dielectric material 17 under the probe 11 highly accurately, it is preferable to contact the probe 11 with the surface of the dielectric material 17, i.e. the recording surface. However, even if the tip of the probe 11 is not contacted with the recording surface, for example, even if the tip of the probe 11 is put closer to the recording surface to the extent that it can be substantially regarded as the contact, the reproduction operation (and moreover, the aforementioned recoding operation) can be performed.

Then, the oscillator 13 oscillates at the resonance frequency of the resonance circuit, which includes the inductor L and the capacitance Cs associated with the dielectric material 17 under the probe 11 as the constituent factors. The center frequency of the resonance frequency is set to approximately 1 GHz, as described above.

Here, the return electrode 12 and the probe 11 constitute one portion of the oscillation circuit 14 including the oscillator 13. The high-frequency signal of approximately 1 GHz, which is applied to the dielectric material 17 from the probe 11, passes through the dielectric material 17 and returns to the return electrode 12, as shown by solid lines in FIG. 4. By disposing the return electrode 12 in the vicinity of the probe 11 and shortening a feedback route to the oscillation circuit including the oscillator 13, it is possible to reduce noise (e.g. a floating capacitance component) entering the oscillation circuit.

In addition, the change of the capacitance Cs corresponding to the nonlinear dielectric constant of the dielectric material 17 is extremely small, and in order to detect this change, it is necessary to adopt a detection method having high detection accuracy. In a detection method using FM modulation, the high detection accuracy can be generally obtained, but it is necessary to further improve the detection accuracy, in order to make it possible to detect the small capacitance change corresponding to the nonlinear dielectric constant of the dielectric material 17. Thus, in the dielectric recording/reproducing apparatus in the embodiment i.e. recording/reproducing apparatus which uses the SNDM principle), the return electrode 12 is located in the vicinity of the probe 11 to shorten the feedback route to the oscillation circuit as much as possible. By this, it is possible to obtain extremely high detection accuracy, and thus it is possible to detect the small capacitance change corresponding to the nonlinear dielectric constant of the dielectric substance.

After the oscillator 13 is driven, the probe 11 is displaced in parallel with the recording surface on the dielectric recording medium 20. By the displacement, the domain of the dielectric material 17 under the probe 11 is changed, and whenever the polarization direction thereof changes, the capacitance Cs changes. If the capacitance Cs changes, the resonance frequency, i.e. the oscillation frequency of the oscillator 13, changes. As a result, the oscillator 13 outputs a signal which is FM-modulated on the basis of the change of the capacitance Cs.

This FM signal is converted to the intermediate frequency which is about several tens MHz on the intermediate frequency convertor 29. The FM signal, whose frequency is converted to the intermediate frequency, is frequency-voltage modulated by the demodulator 30. As a result, the change of the capacitance Cs is converted to the extent of the voltage. The change of the capacitance Cs corresponds to the nonlinear dielectric constant of the dielectric material 17, and the nonlinear dielectric constant corresponds to the polarization direction of the dielectric material 17, and the polarization direction corresponds to the data recorded in the dielectric material 17. Therefore, the signal obtained from the demodulator 30 is such a signal that the voltage changes in accordance with the data recorded in the dielectric recording medium 20. Moreover, the signal obtained from the demodulator 30 is supplied to the signal detector 34, and, for example, coherent detection or synchronized detection is performed, to thereby extract the data recorded in the dielectric recording medium 20.

At this time, on the signal detector 34, an alternating current signal generated by the AC signal generator 21 is used as the reference signal. By this, for example, even if the signal obtained from the demodulator 30 includes many noises or the data to be extracted is weak, the data can be extracted highly accurately by performing the synchronization with the reference signal, as described later.

(iii) Structure of Signal Processing Circuit

Figure 5:
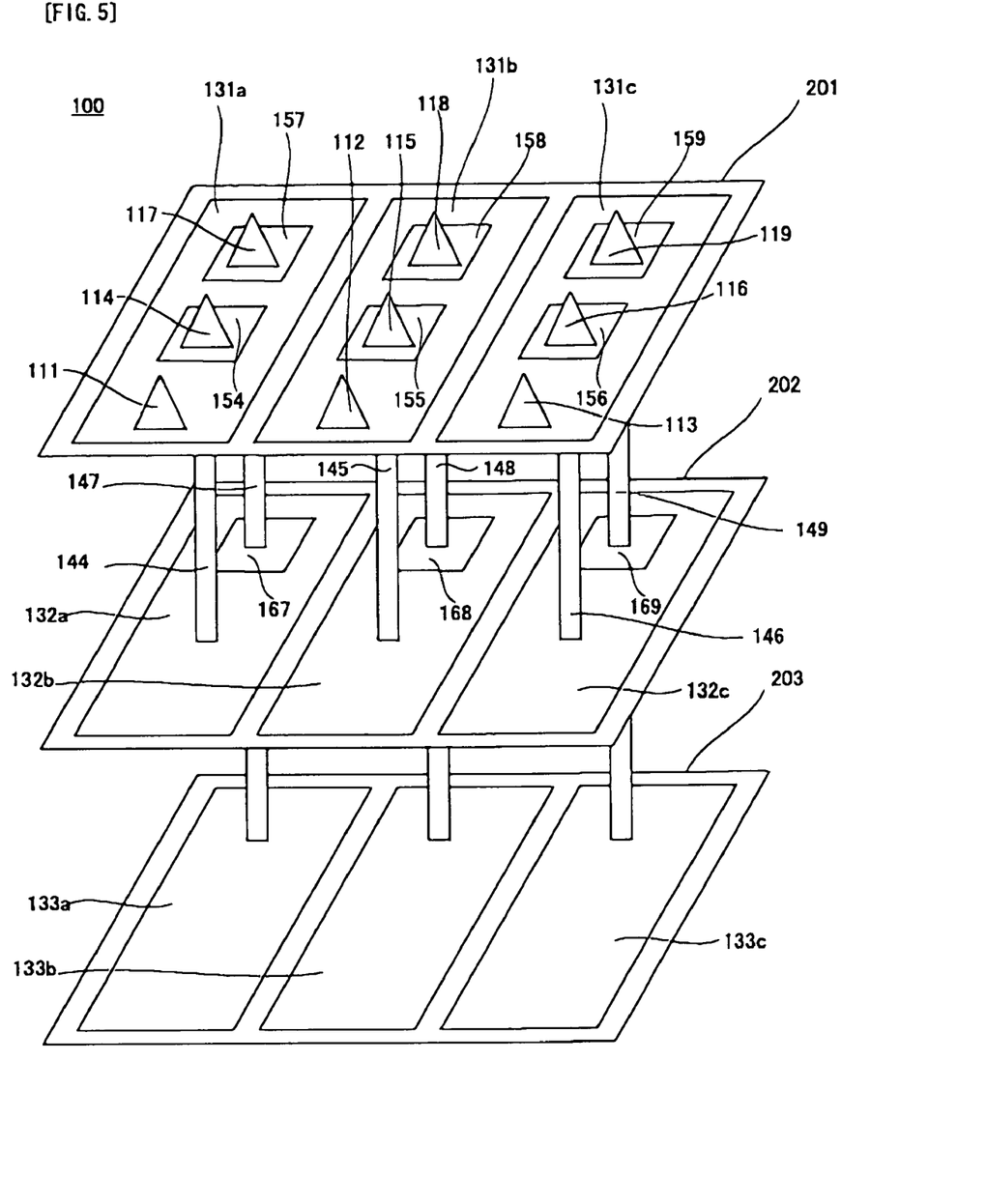
FIG. 5 is a perspective view conceptually showing the basic structure of a signal processing circuit in an embodiment.

Next, with reference to FIG. 5, a more detailed explanation will be given on a specific aspect of the signal processing circuit including the probe 11, the oscillator 13, the demodulator 30, the signal processor 34, and the like, which are used for the dielectric recording/reproducing apparatus in the embodiment, FIG. 5 is a perspective view conceptually showing the basic structure of a signal processing circuit 100 in this embodiment.

As shown in FIG. 5, the signal processing circuit 100 in the embodiment is a circuit for performing signal processing, particularly related to the reproduction operation of the aforementioned dielectric recording/reproducing apparatus 1. The signal processing circuit 100 is provided with: a first circuit 201 which has a plurality of probes 111 to 119 corresponding to the aforementioned probe 11 and a plurality of signal processing devices 131a to 131c; a second circuit 202 which has a plurality of signal processing devices 132a to 132c; and a third circuit which has a plurality of signal processing devices 133a to 133c.

Each of the plurality of probes 111 to 119 has a sharp-pointed tip so as to apply an electric field to the dielectric recording medium 20 (refer to FIG. 2) from the tip side. In particular, each of the probes 111 to 119 preferably has electrical conductivity by doping boron or the like to diamond in the manufacturing thereof. Moreover, not only diamond but also a member which has electrical conductivity, such as boron nitride, can be also used. However, since each of the probes 111 to 119 may contact the dielectric recording medium 20, a harder member is preferably used. Moreover, the tip portion of each of the probes 111 to 119 is a key factor to determine the radius of the polarization formed in association with the data recorded in the dielectric recording medium 20 described later. Thus, it is more preferable that the size of the portion of the tip portion which can particularly directly contact the dielectric recording medium 20 is extremely small on the order of 10 nm.

Each of the signal processing devices 131a to 131c, 132a to 132c, and 133a to 133c has a circuit which operates as the aforementioned oscillator 13 (moreover, as the intermediate frequency convertor 29, the demodulator 30, the signal detector 34, and a structure for performing subsequent signal processing). More specifically, the signal processing device 131a includes the oscillator 13 which oscillates at the resonance frequency of the resonance circuit including the inductor L and the capacitance Cs of the dielectric material 17 under the probe 111 as a constituent factor. The signal processing device 131b includes the oscillator 13 which oscillates at the resonance frequency of the resonance circuit including the inductor L and the capacitance Cs of the dielectric material 17 under the probe 112 as a constituent factor. The signal processing device 131c includes the oscillator 13 which oscillates at the resonance frequency of the resonance circuit including the inductor L and the capacitance Cs of the dielectric material 17 under the probe 113 as a constituent factor. The signal processing device 132a includes the oscillator 13 which oscillates at the resonance frequency of the resonance circuit including the inductor L and the capacitance Cs of the dielectric material 17 under the probe 114 as a constituent factor. The signal processing device 132b includes the oscillator 13 which oscillates at the resonance frequency of the resonance circuit including the inductor L and the capacitance Cs of the dielectric material 17 under the probe 115 as a constituent factor. The signal processing device 132c includes the oscillator 13 which oscillates at the resonance frequency of the resonance circuit including the inductor L and the capacitance Cs of the dielectric material 17 under the probe 116 as a constituent factor. The signal processing device 133a includes the oscillator 13 which oscillates at the resonance frequency of the resonance circuit including the inductor L and the capacitance Cs of the dielectric material 17 under the probe 117 as a constituent factor. The signal processing device 133b includes the oscillator 13 which oscillates at the resonance frequency of the resonance circuit including the inductor L and the capacitance Cs of the dielectric material 17 under the probe 118 as a constituent factor. The signal processing device 133c includes the oscillator 13 which oscillates at the resonance frequency of the resonance circuit including the inductor L and the capacitance Cs of the dielectric material 17 under the probe 119 as a constituent factor. Of course, except for the oscillator 13, each of the signal processing devices may include the intermediate frequency convertor 20, the demodulator 30, and the signal detector 34, which perform the signal processing related to the corresponding probe.

Moreover, the probes 114 to 119, which are disposed in the signal processing devices 131a to 131c on the first circuit 201, are surrounded by insulating portions 154 to 159 such that the signals of the probes are preferably processed on the corresponding signal processing devices.

Here, particularly, a group of the signal processing devices 131a to 131c, a group of the signal processing devices 132a to 132c, and a group of the signal processing devices 133a to 133c are disposed to make a multilayer structure. Specifically, the group of the signal processing devices 131a to 131c is disposed on the first circuit 201 which is the first layer, the group of the signal processing devices 132a to 132c is disposed on the second circuit 202 which is the second layer, and the group of the signal processing devices 133a to 133c is disposed on the third circuit 203 which is the third layer, As a result, each of the signal processing devices 131a to 131c is disposed on the first circuit 201 such that the size of an area occupied by each of the signal processing devices 131a to 131c on the first circuit 201 is larger than an interval in the arrangement of the probes 111 to 119. In other words, each of the signal processing devices 131a to 131c is disposed on the first circuit 201 such that the number (3) of the signal processing devices 131a to 131c on the first circuit 201 is smaller than the number (9) of the probes 111 to 119 on the first circuit 201. In other words, moreover, each of the signal processing devices 131a to 131c is disposed on the first circuit 201 such that the size of the area occupied by each of the signal processing devices 131a to 131c on the first circuit 201 is larger than the size of an area occupied by respective one of the probes 111 to 119 on the first circuit 201. That is, as shown in FIG. 5, the size of the area occupied by each of the signal processing devices 131a to 131c on the first circuit 201 is about ⅓ of the first circuit 201, while the size of the area occupied by respective one of the probes 111 to 119 on the first circuit 201 is about ⅑ of the first circuit 201. Moreover, it is obvious that the same can be true for the signal processing devices 132a to 132c and the signal processing devices 133a to 133c.

Then, the probe and the signal processing device, which are not disposed on the same layer, are electrically connected by a connection line which has electrical conductivity. Specifically, the probe 114 and the signal processing device 132a are electrically connected by a connection line 144. The probe 115 and the signal processing device 132b are electrically connected by a connection line 145. The probe 116 and the signal processing device 132c are electrically connected by a connection line 146. The probe 117 and the signal processing device 133a are electrically connected by a connection line 147. The probe 118 and the signal processing device 133b are electrically connected by a connection line 148. The probe 119 and the signal processing device 133c are electrically connected by a connection line 149. At this time, in order not to make an unnecessarily long transmission distance of the signal through the connection line, the signal processing device for processing the signal of the probe is disposed above the probe (under the probe in FIG. 5). Moreover, if each of the connection lines 147, 148, and 149 passes through the second circuit 202, it passes through respective one of penetration portions 167 to 169 formed on the second circuit 202.

If the group of the signal processing devices 131a to 131c, the group of the signal processing devices 132a to 132c, and the group of the signal processing devices 133a to 133c are not disposed to make a multilayer structure, each of the signal processing devices 131a to 131c, 132a to 132c, and 133a to 133c needs to be disposed on the first circuit 201. In this case, the size of each of the signal processing devices 131a to 131c, 132a to 132c, and 133a to 133c is strictly limited by the interval in the arrangement of the plurality of probes 111 to 119, and it is the size of about ⅑ of the first circuit 201. In this case, the signal processing device, which needs a relatively large space, cannot be disposed with it accompanying respective one of the probes 111 to 119. Alternatively, unless the signal processing device is limited to perform a relatively simple process or the occurrence of crosstalk is allowed to some extent, the signal processing device, which needs a relatively large space, cannot be disposed with it accompanying respective one of the probes 111 to 119.

According to the embodiment, however, it is possible to relatively increase the size of each of the signal processing devices 131a to 131c, 132a to 132c, and 133a to 133c. In other words, each of the signal processing devices 131a to 131c, 132a to 132c, and 133a to 133c can be disposed without being strictly limited by the interval in the arrangement of the plurality of probes 111 to 119. By this, it is possible to dispose the signal processing device, which needs a relatively large space, with it accompanying respective one of the probes 111 to 119.

Moreover, since the signal processing device can be disposed with it accompanying the probe, it is unnecessary to provide the oscillator 13 (moreover, the demodulator 30, the signal detector 34, or the like) on the exterior of the signal processing circuit 100. In other words, it is possible to perform the aforementioned reproduction operation by using the signal processing circuit 100 provided with the probes 111 to 119 and the oscillator 13 (moreover, the demodulator 30, the signal detector 34, or the like). Therefore, it is possible to prevent a bad influence by a change in floating capacitance, the generation of noise, and the like, which are caused by the extraction of the signals to the exterior. In particular, on the dielectric recording/reproducing apparatus 1, as described above, the change in the capacitance Cs corresponding to the nonlinear dielectric constant of the dielectric material 17 is small, and in order to detect it, it is necessary to employ a detection method with high detection accuracy. From this viewpoint, if the signal processing device is disposed with it accompanying the probe, the signal processing can be performed, more stably or more highly accurately, in which the bad influence by the change in floating capacitance, the generation of noise, and the like is prevented. Thus, it can be said that the dielectric recording/reproducing apparatus 1 in the embodiment (specifically, the signal processing circuit 100) has an extremely great advantage.

Moreover, even if the signals are outputted to the exterior of the signal processing circuit 100, since the signal processing is performed on each of the processing devices 131a to 131c, 132a to 132c, and 133a to 133c which accompany the respective probes 111 to 119, the more stable signals can be outputted to the exterior.

Moreover, the aforementioned embodiment describes that a signal from one probe is processed on the signal processing device as one independent signal and then outputted as one signal; however, the present invention is not limited to this. For example, signals from a plurality of probes may be used and outputted as one signal. For example, signals of three recording tracks, which are adjacent on the dielectric recording medium 20, may be simultaneously detected by using three probes, and one signal with a crosstalk component from the adjacent track removed may be outputted.

(iv) Modified Examples

Figure 6:
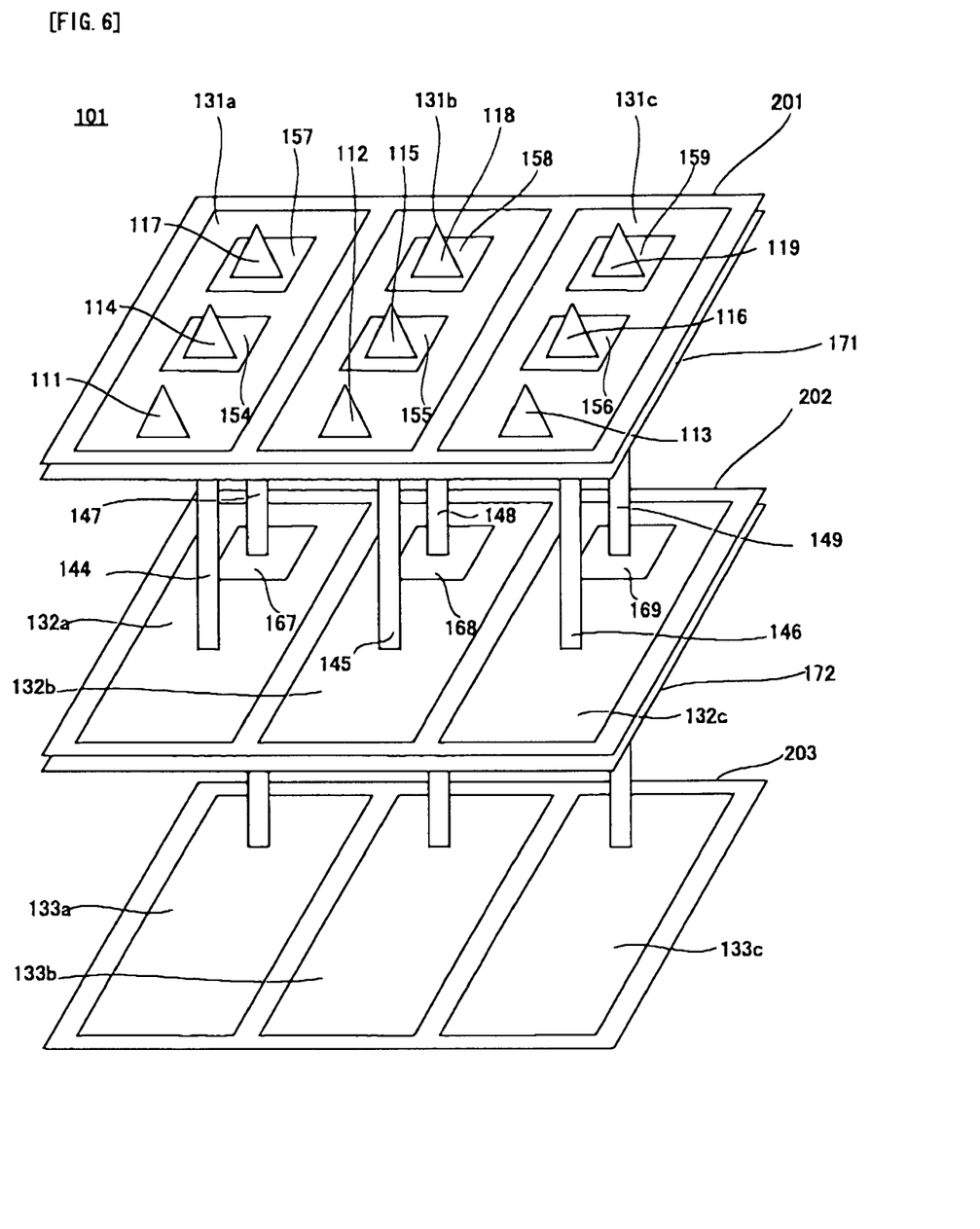
FIG. 6 is a perspective view conceptually showing the basic structure of a signal processing circuit in a first modified example.
Figure 7:
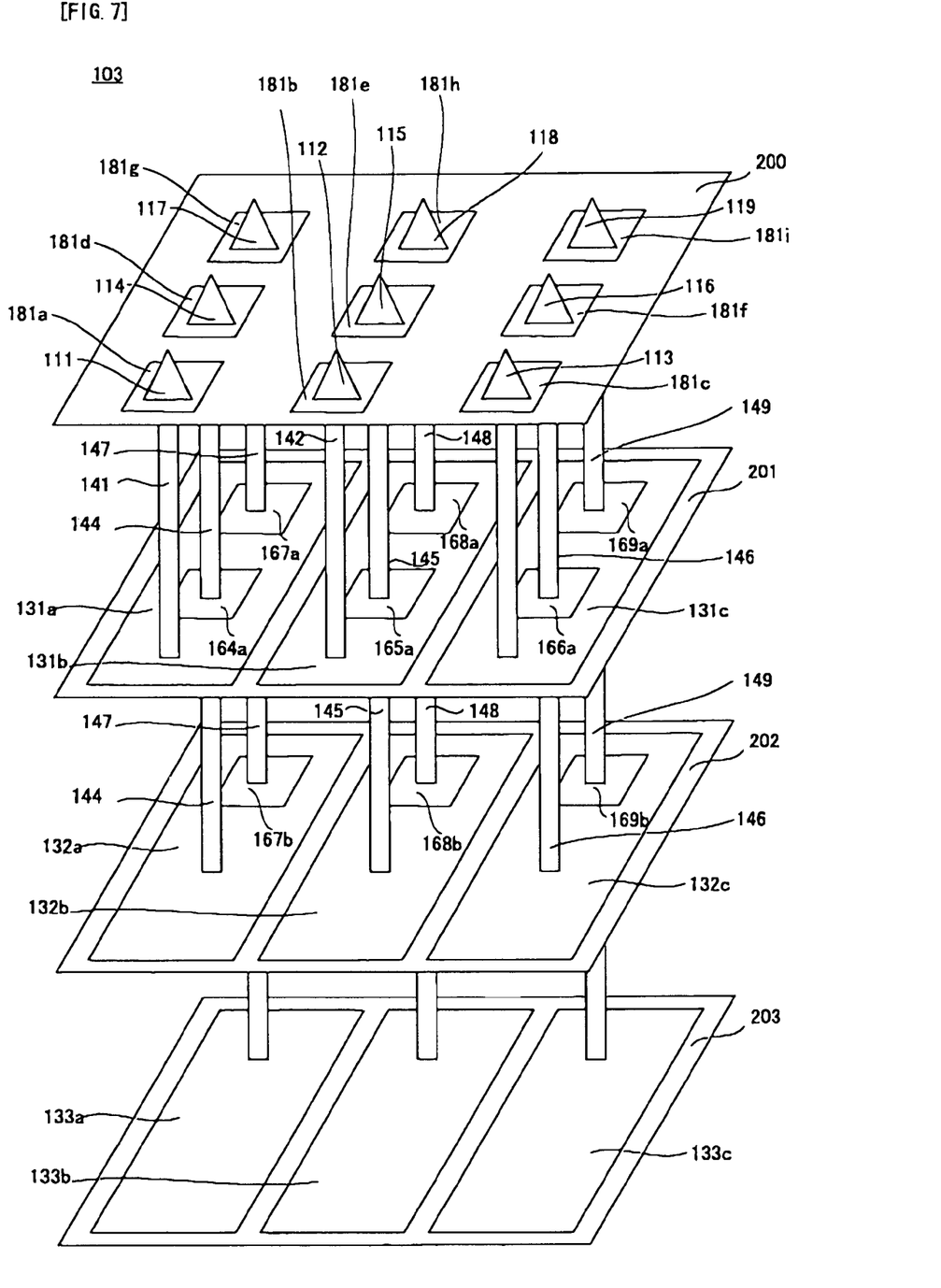
FIG. 7 is a perspective view conceptually showing the basic structure of a signal processing circuit in a second modified example.

Next, with reference to FIG. 6 and FIG. 7, a signal processing apparatus in a modified example will be explained. FIG. 6 is a perspective view conceptually showing the basic structure of a signal processing circuit in a first modified example. FIG. 7 is a perspective view conceptually showing the basic structure of a signal processing circuit in a second modified example.

As shown in FIG. 6, a signal processing circuit 101 in the first modified example has a shield layer 171, which has a ground potential, disposed between the first circuit 201 and the second circuit 202. Moreover, a shield layer 172, which has a ground potential, is disposed between the second circuit 202 and the third circuit 203.

By disposing the shield layer 171 in this manner, it is possible to preferably eliminate an increase in noise by the high-frequency signal crosstalk with respect to the second circuit 202, which can be caused by disposing the plurality of signal processing devices 131a to 131c on the first circuit 201, or to preferably eliminate an increase in noise by the high-frequency signal crosstalk with respect to the first circuit 201, which can be caused by disposing the plurality of signal processing devices 132a to 132c on the second circuit 202. With regard to the shield layer 172, it is also possible to preferably eliminate an increase in noise by the high-frequency signal crosstalk with respect to the third circuit 203, which can be caused by disposing the plurality of signal processing devices 132a to 132c on the second circuit 202, or to preferably eliminate an increase in noise by the high-frequency signal crosstalk with respect to the second circuit 202, which can be caused by disposing the plurality of signal processing devices 133a to 133c on the third circuit 203. By this, it is possible to realize the stable signal processing with a less bad influence by the high-frequency crosstalk, which can be generated between the different layers.

Moreover, as shown in FIG. 7, a signal processing circuit 103 in the second modified example is provided with: a first-stage circuit 200 having a plurality of probes 111 to 119 and a plurality of first-stage processing devices 181a to 181i; a first circuit 201 having a plurality of signal processing devices 131a to 131c; a second circuit 202 having a plurality of signal processing devices 132a to 132c; and a third circuit 203 having a plurality of signal processing devices 133a to 133c.

Each of the first-stage processing devices 181a to 181i has a circuit which operates as the aforementioned oscillator 13, the intermediate frequency conversion circuit 29, or a not-illustrated amplification circuit. On the other hand, each of the signal processing devices 131a to 131c, 132a to 132c, and 133a to 133c has a circuit which operates as the aforementioned demodulator 30 and the signal detector 34 (moreover, a structure for performing subsequent signal processing). Therefore, if an alternating electric field is applied from each of the probes 111 to 119 to the dielectric recording medium 20, signals which are FM-modulated on the basis of the change in the capacitance Cs are outputted on the first-stage processing devices 181a to 181i, and the signals are converted to have an intermediate frequency. The signals, which are converted to have the intermediate frequency, are outputted through the connection lines 141 to 149 and further through the penetration devices 164 to 169 to the respective signal processing devices out of the signal processing devices 131a to 131c, 132a to 132c, and 133a to 133c. Then, the aforementioned demodulation process and signal detection process are performed. After that, the signal processing may be further performed on the signal processing devices, Alternatively, the signal processing may be performed after the signals are outputted to a signal processing circuit which is provided on the exterior of the signal processing circuit 103.

As described above, the first-stage processing devices 181a to 181i the number of which is the same as the number (9) of the probes 111 to 119 may be disposed on the same layer as that of the probes 111 to 119. By virtue of such construction, the frequency of the signals may be reduced to the intermediate frequency before the signals are outputted through the connection lines 141 to 149. Thus, even when the signals are outputted through the connection lines 141 to 149, it is possible to preferably prevent the change in floating capacitance and the generation of noise. By this, it is possible to reduce a SN ratio, and it is also possible to ensure the stability of the operation related to the signal processing, more preferably.

Incidentally, in the aforementioned embodiment, the dielectric material 17 is used as the recording layer; however, from the viewpoint of the presence or absence of the nonlinear dielectric constant and spontaneous polarization, the dielectric material 17 is preferably a ferroelectric substance.

Moreover, the signal processing circuit 100 or the like in the aforementioned embodiment is not limitedly used for the recording/reproducing apparatus related to the SNDM explained in the embodiment, but it may be used for a scanning capacitance microscope, such as a SCaM, or various recording/reproducing apparatuses.

Moreover, in the present invention, various changes may be made, if desired, without departing from the essence or spirit of the invention which can be read from the claims and the entire specification. A signal processing circuit and a reproducing apparatus, which involve such changes, are also intended to be within the technical scope of the present invention.

INDUSTRIAL APPLICABILITY

The signal processing circuit and the reproducing apparatus of the present invention can be applied to a signal processing circuit for performing signal processing when polarization information, recorded in a dielectric substance, such as a ferroelectric recording medium, is reproduced, and a reproducing apparatus which uses the signal processing circuit.

The invention claimed is:

1. A signal processing circuit comprising:
   a signal input layer comprising a plurality of signal inputting devices which are arranged with a predetermined arrangement interval and each of which receives a signal input;
   a plurality of signal processing layers in which a plurality of signal processing devices are distributedly arranged, the signal processing devices being provided correspondingly to the respective plurality of signal inputting devices, the signal processing devices performing a parallel operation on signals from the plurality of signal inputting devices; and
   connection lines for connecting the plurality of signal inputting devices and the respective plurality of signal processing devices in association with each other,
   a size of an area occupied by each of the plurality of signal processing devices on said plurality of signal processing layers being larger than a size of an area occupied by each of the plurality of signal inputting devices on said signal input layer.

2. The signal processing circuit according to claim 1, wherein the plurality of signal inputting devices are arranged in a two-dimensional matrix.

3. The signal processing circuit according to claim 1, wherein at least one of the plurality of signal inputting devices includes an electrically conductive probe which is close to or contacts a micro domain on a medium, which is a target to receive the signal input.

4. The signal processing circuit according to claim 1, wherein at least one of the plurality of signal processing devices converts a capacitance change in a micro domain on a medium, which is a target to receive the signal input, to a voltage change.

5. The signal processing circuit according to claim 1, wherein at least one of the plurality of signal processing devices includes an oscillation circuit whose oscillation frequency changes depending on a capacitance change in a micro domain on a medium, which is a target to receive the signal input.

6. The signal processing circuit according to claim 5, wherein at least one of the plurality of signal processing devices further includes an intermediate frequency conversion circuit for converting the oscillation frequency to an intermediate frequency.

7. The signal processing circuit according to claim 1, further comprising a sealed layer, which defines a ground potential, between each two of said plurality of signal processing layers.

8. The signal processing circuit according to claim 1, further comprising a first-stage processing layer which comprises a plurality of first-stage processing devices which are disposed correspondingly to the respective plurality of signal inputting devices and which perform a first-stage process on the signals from the plurality of signal inputting devices, said connection lines connecting the plurality of signal inputting devices and the respective plurality of first-stage processing devices in association with each other, said connection lines connecting the plurality of first-stage processing devices and the respective plurality of signal processing devices in association with each other.

9. The signal processing circuit according to claim 8, wherein at least one of the plurality of first-stage processing devices includes an oscillation circuit whose oscillation frequency changes depending on a capacitance change in a micro domain on a medium, which is a target to receive the signal input.

10. The signal processing circuit according to claim 9, wherein at least one of the plurality of first-stage processing devices further includes an intermediate frequency conversion circuit for converting the oscillation frequency to an intermediate frequency.

11. A reproducing apparatus for reproducing data recorded in a recording medium, said reproducing apparatus comprising:
the signal processing circuit according to claim 1; and
a reproducing device for reproducing the data on the basis of processing results by the plurality of signal processing devices.

12. The reproducing apparatus according to claim 11, wherein
said reproducing apparatus reproduces the data recorded in the recording medium in a flat plane shape; and
said reproducing apparatus comprises a device for shifting a relative positional relationship between the recording medium and a probe in the flat plane.

13. A signal processing circuit comprising:
a signal input layer comprising a plurality of signal inputting devices which are arranged with a predetermined arrangement interval and each of which receives a signal input;
a plurality of signal processing layers in which a plurality of signal processing devices are distributedly arranged, the signal processing devices being provided correspondingly to the respective plurality of signal inputting devices, the signal processing devices performing a parallel operation on the signals from the plurality of signal inputting devices; and
connection lines for connecting the plurality of signal inputting devices and the respective plurality of signal processing devices in association with each other,
the number of the plurality of signal processing devices on each of said plurality of signal processing layers being smaller than the number of the plurality of signal inputting devices on said signal input layer.

14. The signal processing circuit according to claim 13, wherein the plurality of signal inputting devices are arranged in a two-dimensional matrix.

15. The signal processing circuit according to claim 13, wherein at least one of the plurality of signal inputting devices includes an electrically conductive probe which is close to or contacts a micro domain on a medium, which is a target to receive the signal input.

16. The signal processing circuit according to claim 13, wherein at least one of the plurality of signal processing devices converts a capacitance change in a micro domain on a medium, which is a target to receive the signal input, to a voltage change.

17. The signal processing circuit according to claim 13, wherein at least one of the plurality of signal processing devices includes an oscillation circuit whose oscillation frequency changes depending on a capacitance change in a micro domain on a medium, which is a target to receive the signal input.

18. The signal processing circuit according to claim 17, wherein at least one of the plurality of signal processing devices further includes an intermediate frequency conversion circuit for converting the oscillation frequency to an intermediate frequency.

19. The signal processing circuit according to claim 13, further comprising a sealed layer, which defines a ground potential, between each two of said plurality of signal processing layers.

20. The signal processing circuit according to claim 13, further comprising a first-stage processing layer which comprises a plurality of first-stage processing devices which are disposed correspondingly to the respective plurality of signal inputting devices and which perform a first-stage process on the signals from the plurality of signal inputting devices,
said connection lines connecting the plurality of signal inputting devices and the respective plurality of first-stage processing devices in association with each other,
said connection lines connecting the plurality of first-stage processing devices and the respective plurality of signal processing devices in association with each other.

21. The signal processing circuit according to claim 20, wherein at least one of the plurality of first-stage processing devices includes an oscillation circuit whose oscillation frequency changes depending on a capacitance change in a micro domain on a medium, which is a target to receive the signal input.

22. The signal processing circuit according to claim 21, wherein at least one of the plurality of first-stage processing devices further includes an intermediate frequency conversion circuit for converting the oscillation frequency to an intermediate frequency.

23. A reproducing apparatus for reproducing data recorded in a recording medium, said reproducing apparatus comprising:
the signal processing circuit according to claim 13; and
a reproducing device for reproducing the data on the basis of processing results by the plurality of signal processing devices.

24. The reproducing apparatus according to claim 23, wherein
said reproducing apparatus reproduces the data recorded in the recording medium in a flat plane shape, and
said reproducing apparatus comprises a device for shifting a relative positional relationship between the recording medium and a probe in the flat plane.

* * * * *